2. Sheets.
Sheet-1.

W. Adamson
Treating Offal.

No. 2,114. Reissued Nov. 28. 1865.

Witnesses:
Charles E. Foster
M. R. Delaney.

Inventor:
Wm. Adamson
By his Atty
Henry Howson

2 Sheets.
Sheet 2.

W. Adamson.
Treating Offal.

No 2,114. Reissued Nov. 28. 1865.

Witnesses:
Charles E. Foster
M. Delany.

Inventor:
Wm. Adamson.
By his Atty
Henry Howson

UNITED STATES PATENT OFFICE.

JOHN P. BAUGH, EDWIN P. BAUGH, AND DANIEL BAUGH, ALL OF PHILADELPHIA, PA., ASSIGNEES OF WILLIAM ADAMSON.

IMPROVED METHOD OF TREATING OFFAL.

Specification forming part of Letters Patent No. 46,318, dated February 14, 1865; Reissue No. 2,114, dated November 28, 1865.

*To all whom it may concern:*

Be it known that we, JOHN P. BAUGH, EDWIN P. BAUGH, and DANIEL BAUGH, (trading under the firm of BAUGH & SONS,) of Philadelphia, Pennsylvania, are the owners of certain Letters Patent for the Treatment of Offal, granted to WILLIAM ADAMSON on the 14th day of February, 1865; and we do hereby declare the following to be a full, clear, and exact description of the same, reference being had to the accompanying drawings, and to the letters of reference marked thereon.

The invention of the said WILLIAM ADAMSON consists, first, in utilizing offal by draining from it the greater portion of its fluid-matter, which, if permitted to remain in the mass, causes fermentation and noxious exhalations and prevents the rapid and effective drying which is necessary before the offal is rendered available as a manure; secondly, the invention consists in simultaneously drying and disinfecting the drained offal by subjecting it to the direct action of the products of combustion.

In order to enable others to practice the invention, we will now proceed to describe a mode of carrying it into effect.

In Chicago and other cities of the West, where vast quantities of hogs and other cattle are slaughtered, the proper disposal of the offal has become a subject of much consideration. It has hitherto been the practice to throw the offal into the rivers and creeks, to the annoyance of those living in the neighborhood and to the detriment of the public health. Recently attempts have been made to utilize this offal by converting it into a fertilizer, the offal being placed in heaps on the ground and permitted to ferment, after which it was spread out and permitted to dry. This plan proved to be impracticable, owing to the offal being exposed without first draining from it the fluid portion preparatory to the drying, the presence of the fluid-matter causing rapid fermentation and the most noxious exhalations.

The accompanying drawings, which form a part of this specification, illustrate a plan by which the important preparatory step of draining the offal and the subsequent step of disinfecting it may be accomplished.

Figure 1:
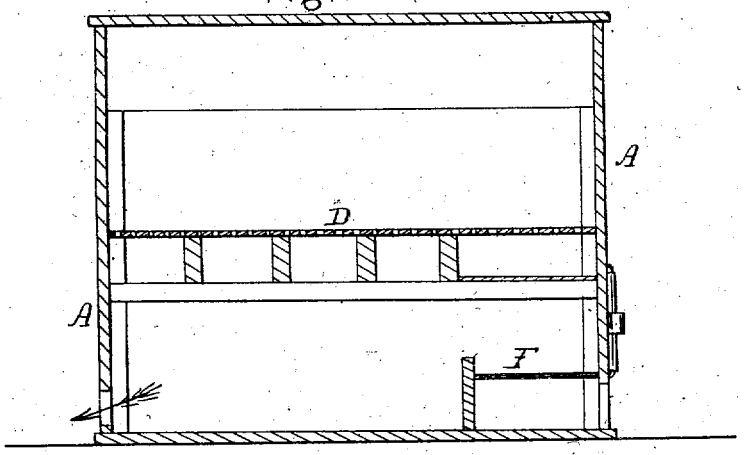
Figure 2:
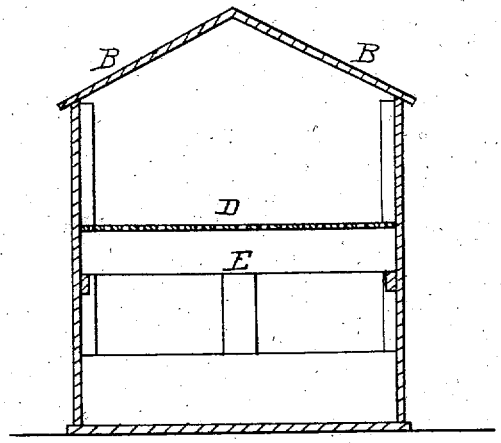
Figure 3:
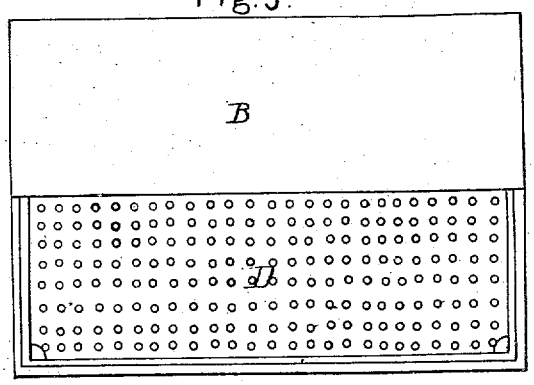

Figure 1 represents a vertical section of a building, by which the invention can be carried into effect; Fig. 2, a transverse section; Fig. 3, a plan view, and Fig. 4 a modified form of building.

The building A may be either of brick, wood, or other suitable material; should be about twice as long as it is broad, and should have the usual inclined roof B, part of which is detachable for the introduction of the offal, which is deposited on a draining floor or platform, D, consisting of perforated plates, wire-netting, or grating, supported by suitable joists, E. Beneath the floor and at one end of the building is a fire-place, F, for receiving the fuel, by means of which the process is in part effected.

Figure 4:
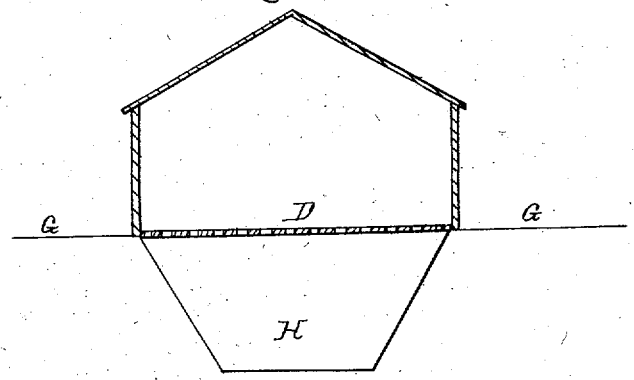

Another and more economical mode of constructing the building is that illustrated in Fig. 4, where G represents the surface of the ground, and H a trench with inclined sides, which may be simply paved or cemented, or even the bare ground will in some cases suffice. The grated floor or perforated platform D is in this instance on a level with the surface of the ground, and is covered by a low building, I, the roof of which, or a portion of it, is detachable. Having deposited on the grating or floor a layer of straw or stubble or twigs or branches of trees, we place on the latter a mass of offal from the slaughter-houses, &c., and allow it to remain until the greater portion of the fluid-matter is drained from it, after which the mass may be dried by simple exposure to the air, without emitting the noxious exhalations resulting from the exposure of undrained offal. The inventor, however, preferred to use the direct action of the products of combustion, which caused a simultaneous drying and disinfecting. In order to do this, a fire is kindled in the fire-place F, and the products of combustion permitted to pervade the whole space beneath the grated floor D. The fire is continued, and the products of combustion permitted to pass through the offal, which finally becomes dry, disinfected, and ready for removal. It is then treated according to any of the usual processes for making phosphates or animal manure. While the fire is burning, we, from time to time, throw onto it spent tan, grape-vine twigs, or any other matter containing tannin, the fumes and smoke from which have rapid and certain disinfecting properties.

By the above-described processes, all offal hitherto discarded and heretofore deemed a nuisance, and a matter difficult to dispose of, can be converted into a manure at a very trifling cost compared with its value as a fertilizer.

It will be evident that in some climates the drying of the drained offal may be effected without the aid of fuel, simple exposure to a dry atmosphere being sufficient to reduce the offal to a condition fit for conversion into phosphates.

It will be evident, too, that the buildings for carrying out the process may be varied as regards form and construction, without departing from the main features of the invention. The fire-place, for instance, may be at a distance, and the products of combustion conveyed along suitable passages to the space beneath the grated floor.

We claim as the invention of the said WILLIAM ADAMSON and desire to secure by Letters Patent,—

1. Utilizing offal by draining from it the greater portion of its fluid-matter preparatory to the drying of the mass, for the purpose described.

2. Simultaneously drying and disinfecting offal by subjecting it to the direct action of the products of combustion, substantially in the manner set forth.

In testimony whereof we have signed our names to this specification before two subscribing witnesses.

J. P. BAUGH.
E. P. BAUGH.
DANL. BAUGH.

Witnesses:
JOHN WHITE,
JOHN D. MCGRATH.